July 2, 1929.  C. PARKER  1,719,811
APPARATUS AND PROCESS FOR MAKING CHAIN LINKS WITH INTEGRAL ATTACHMENTS
Filed April 17, 1925  5 Sheets-Sheet 1

Fig. 1

INVENTOR.
Charles Parker
BY C. H. Braddock
ATTORNEY

July 2, 1929.  C. PARKER  1,719,811
APPARATUS AND PROCESS FOR MAKING CHAIN LINKS WITH INTEGRAL ATTACHMENTS
Filed April 17, 1925  5 Sheets-Sheet 2

INVENTOR.
Charles Parker
BY
G. H. Braddock
ATTORNEY

July 2, 1929.  C. PARKER  1,719,811
APPARATUS AND PROCESS FOR MAKING CHAIN LINKS WITH INTEGRAL ATTACHMENTS
Filed April 17, 1925   5 Sheets-Sheet 5

INVENTOR.
Charles Parker
BY G. H. Braddock
ATTORNEY

Patented July 2, 1929.

1,719,811

UNITED STATES PATENT OFFICE.

CHARLES PARKER, OF BRIDGEPORT, CONNECTICUT, ASSIGNOR TO THE LOCKE STEEL CHAIN COMPANY, OF BRIDGEPORT, CONNECTICUT, A CORPORATION OF CONNECTICUT.

APPARATUS AND PROCESS FOR MAKING CHAIN LINKS WITH INTEGRAL ATTACHMENTS.

Application filed April 17, 1925. Serial No. 23,815.

This invention relates to a new chain link and to a novel process and improved apparatus for making the same. It pertains essentially to a type of link known as type C and to a sheet metal (so-called) "corn binder" link and to the manufacture of this special type of link, and is an improvement upon inventions relating to both "built-up" and "cast" "corn binder" links, or other links of C type, as well as upon inventions relating to processes and apparatuses for manufacturing special types of sheet metal chain links and chain, of the character, for example, of my invention disclosed in my pending application for patent, Serial No. 756,670, filed December 18, 1924.

The broad objects of the invention are to produce a new and improved link of C type, which may be a "corn binder" link, consisting of a single piece of sheet metal, which link will be superior in working and wearing or lasting quality to any link of similar type heretofore known; to provide a method by which the manufacture of the new and improved link can be accomplished with great facility; and to provide simple and practical apparatus whereby the method can be economically practiced.

Sheet metal chain links and chain are customarily manufactured from flat sheet metal strip by feeding the strip forwardly step by step to suitable forming dies, such, for example as those illustrated and described in my application for patent above identified, constructed to transform the strip into links. My application Serial No. 756,670 additionally discloses an apparatus and method for providing chain links and chain with special attachments or wings bent to any preferred positions with respect to the links.

A "corn binder" link of commerce consists of a link body portion, including side bars and end bars, the end bars being for the purpose of assembling the link with adjacent links of the same or a different type in a chain, and of a working attachment or wing adjacent to or contiguous with one of the end bars, including an extension of the link body arranged at an angle thereto, and usually including braces between the extension and body. Heretofore, so far as I am aware, "corn binder" links have been either "cast" or "built-up", the built up links usually being of sheet metal.

The specific objects of the invention are, therefore, to produce a link of type C, which may be a "corn binder" link, composed of but a single piece of sheet metal comprising the side and end bars of the link, as well as the working attachment or wing thereof; to devise a method which can be continuously practiced upon a single machine to manufacture this special type of link; and to provide in said machine suitable apparatus, consisting of properly correlated forming, bending, and shaping dies, capable of systematically carrying out the steps of the method in a practical and economical manner.

Other objects and advantages of the invention will be obvious from the drawings and description of construction and operation of a machine, equipped with the improved apparatus and capable of carrying out the steps of the novel method, and of the structure of a corn binder link, herein selected for the purpose of illustration.

In the accompanying drawings forming a part of this specification,

Fig. 5 is an enlarged view of the dies, showing them in section with a strip of metal between them;

Fig. 6 is a fragmentary sectional view corresponding with the showing of the left hand end of Fig. 5, disclosing the upper die in its elevated position;

Fig. 6ª is a detail of the presser foot;

Fig. 7 is a sectional view on line 7—7 in Fig. 5;

Fig. 8 is a sectional view on line 8—8 in Fig. 5;

Figure 1:
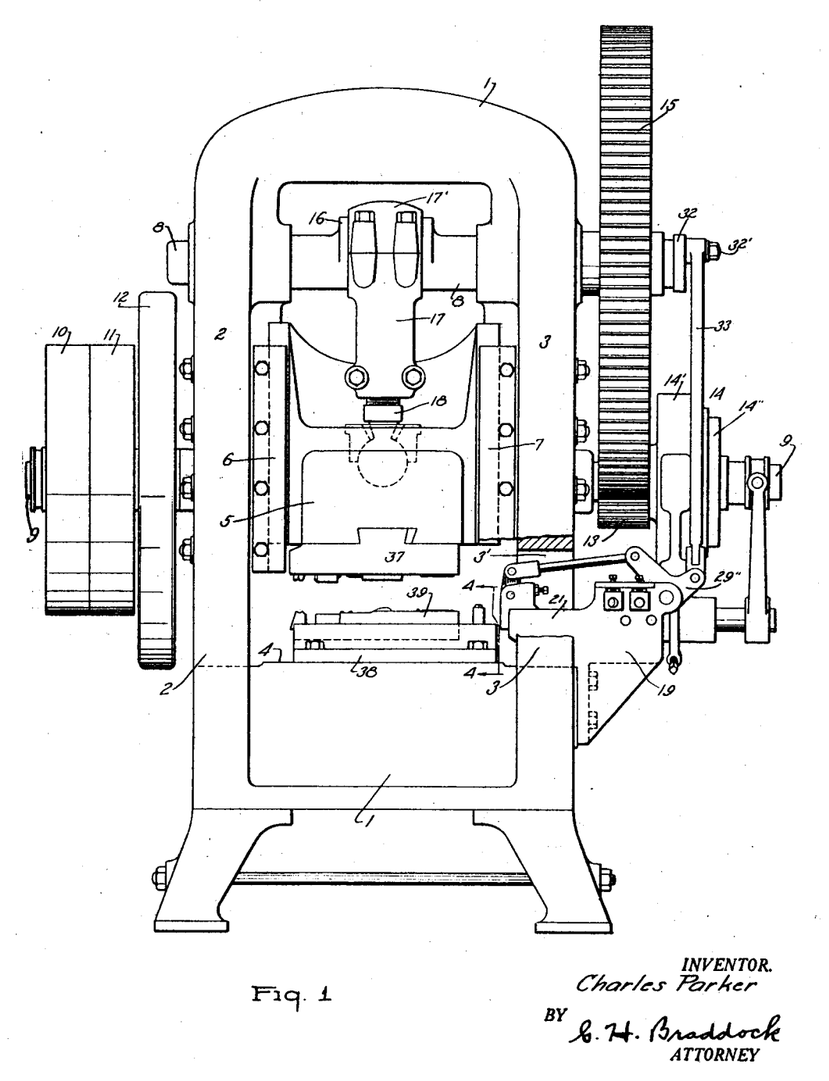
Fig. 1 is a front view, partly in section, of a machine equipped with the apparatus and capable of carrying out the steps of the method to produce the "corn binder" link of the invention.

In the drawings, 1 indicates as an entirety the main frame of the machine comprising uprights 2, 3, and a bed 4 arranged between the uprights.

5 is a vertically reciprocable slide mounted to move up and down in guides 6, 7, on the main frame.

8 is a main drive shaft transversely mounted in bearings at the upper end of the frame. 9 is a counter shaft transversely mounted upon the main frame and extending from one side to the other thereof. At one side of the main frame the counter shaft carries a loose pulley 10, a fast pulley 11, and a fly wheel 12. At the other side of the frame the said counter shaft has mounted loosely upon it a pinion 13 carrying one element 14′ of a clutch 14, the other element 14″ of which is splined to the counter shaft 9. Any suitable mechanism may be employed for throwing the longitudinally movable element 14″ of said clutch into and out of engagement with the element 14′, so as to transmit power through the pinion 13. 15 is a gear wheel rigidly secured to said main shaft and in mesh with the pinion 13.

16 is an eccentric on the main shaft 8 connected by eccentric straps 17, 17′ and pitman 18 to the slide 5.

As the construction of the press itself forms no part of the invention, any well known type of press having a reciprocable slide and a bed or bolster beneath it may be readily adapted to operate the chain link forming mechanism to be hereinafter described, and no further description of the press shown in the drawing is deemed necessary, as this particular press has been chosen simply for illustrative purposes and not in any limiting sense.

Figure 2:
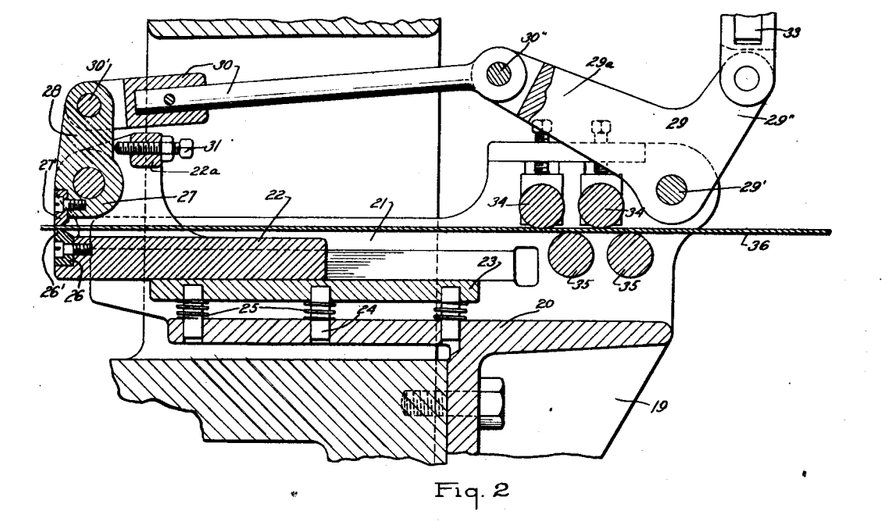
Fig. 2 is a view partly in side elevation and partly in section of the strip feed mechanism on said machine;

Any suitable mechanism may be attached to the press for feeding the stock or strip of metal from which the chain links are to be formed across the bed or bolster of the press. For the purpose of illustration, I have, in the drawings, shown a feed mechanism of which 19 is a bracket secured to the standard 3 of the frame and having a horizontally disposed platform 20, the inner end of which extends into a hole 3′ through the standard 3.

Figure 3:
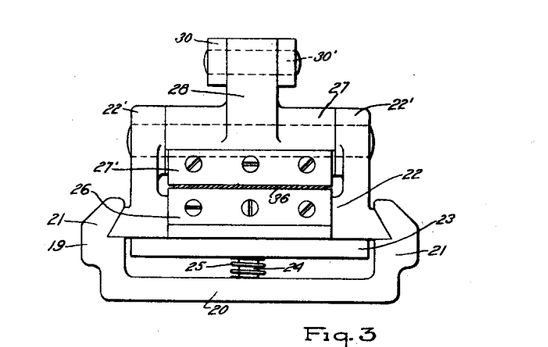
Fig. 3 is a front view of a portion of the strip feed mechanism, detached.
Figure 4:
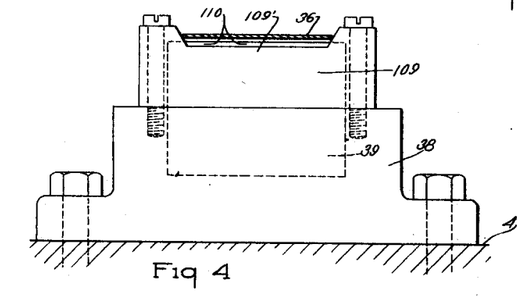
Fig. 4 is an enlarged sectional view on line 4—4 in Fig. 1.

21, 21, are side walls extending vertically upward, one at each side of the platform 20. 22 is a horizontally reciprocable slide suitably mounted at either side in guideways in the said side walls 21. It rests upon a horizontally disposed friction plate 23 having downwardly extending pins 24, 24, each surrounded by a coil spring 25 bearing at its upper end against the plate 23 and at its lower end against the platform 20 so as to provide a yielding support for the slide 22 which normally tends to press the slide against the upper walls of its guideways to insure the closing of the feed jaws, to be hereinafter described, before the slide commences to move forward.

26 is a gripping piece carried by the slide 22, having an upturned jaw 26′ adapted to engage the under surface of the stock or strip of metal to be fed across the bed or bolster.

27 is an oscillatable gripping dog having a jaw 27′ adapted to engage the upper surface of the strip of metal to be fed, at a point directly above the gripping jaw 26′. This gripping jaw 27 is pivotally mounted between upwardly extending lugs or ears 22′, 22′, on the slide 22, and carries an upwardly extending arm 28.

29 is a bell crank lever pivotally connected at 29′ between the side walls 21 of the bracket 19.

30 is a rod pivotally connected at 30′ to the upper end of the arm 28, and at 30″ to the free end of the arm 29ª of the bell crank lever 29.

31 is an adjustable stop for limiting the throw of the arm 28 in clockwise direction. This stop preferably consists of a screw extending through a threaded opening in a cross bar 22ª which latter extends between the ears 22′, 22′, on the slide 22.

32 is a crank disc carried by the main drive shaft 8 and having a crank pin 32′ to which is pivotally connected one end of a connecting rod 33, the other end of which is suitably connected to the free end of the arm 29″ of the bell crank lever 29.

34, 34, and 35, 35, are straightening rolls for the strip of metal or stock. These rolls are horizontally disposed and suitably mounted between the side walls 21, 21 on the bracket 19. A strip of metal, indicated 36, is directed between the rolls 34, 34, and 35, 35, and between the gripping lips 26′ and 27′. The dog 27 and arm 28 are shaped and proportioned to have a slight rocking movement relative to the slide 22, so that in normal operation, as the connecting rod is drawn to the right in Figs. 1 and 2, the gripping jaw 27′ is rocked out of engagement with the upper surface of the strip of metal 36. The arm 28 then engages the stop 31 and the slide 22 recedes with the connecting rod 30. Upon the reversal of travel of the rod 30, it rocks forward the upper end of the arm 28 and causes the gripping jaw 27' to engage the upper surface of the strip 36, thereby gripping the said strip firmly between the jaws 26' and 27', and the slide 22 and strip 36 are together fed forward.

In practicing the novel method of the invention, I first produce upon the upper and lower surfaces of said strip of metal and adjacent the side edges thereof, areas of score marking the outlines of portions of the metal to be removed to define a body and a working attachment or wing of a complete link, the areas of score being preferably made with a view of providing beveled edges upon the side edges of said body and working attachment or wing, as will be understood, so that the attachment or wing of a link can be later bent with respect to the body thereof and the braces of the attachment or wing can be bent with respect to its extension member without liability of the objectionable production of burr or the cracking of the metal of the body or of the working attachment or wing of a link; and I simultaneously produce upon the upper and lower surfaces of the portion of said strip of metal defining said body, parallel lines of score, which are approximately in the direction of the feed of the strip of metal, and a transverse line of score, between said parallel lines, to define the side and end bars of the link body. I next sever the metal of the link blank along the parallel and transverse lines of score and throw the metal of the link body to define the short, narrow lip of the small end bar and the long, narrow lip of the large end bar of the link blank slightly upwardly beyond the plane of the side bars thereof, and crimp said lips; and I simultaneously sever the metal along the areas of score marking the outlines of the working attachment or wing of the link, thus removing the portions defining the working attachment from the strip. I next further shape the end bars of the link body, and I simultaneously produce upon the lower surface of the metal a transverse score defining the rear end of a link blank and sever the metal along the areas of score marking the outlines of said link body, thus removing the portions defining said link body concurrently with the removal of portions defining the working attachment or wing of the next preceding link blank. I next finally shape said end bars of the link body, and simultaneously bend the braces of the working attachment or wing of the link with respect to the link extension of said working attachment or wing. And I next finally sever the link blank from the strip of metal, and simultaneously bend the working attachment or wing as a whole (the extension and braces thereof having been previously properly set with respect to each other) with respect to the link body, to complete the link. The sprocket or large end bar is not rolled to final form in the machine, but is put in condition for its rolling operation—an operation which assembles the link with the small end bar of a different similar or dissimilar link, as may be desirable.

Figures 5, 6, 6A, 7, 8:
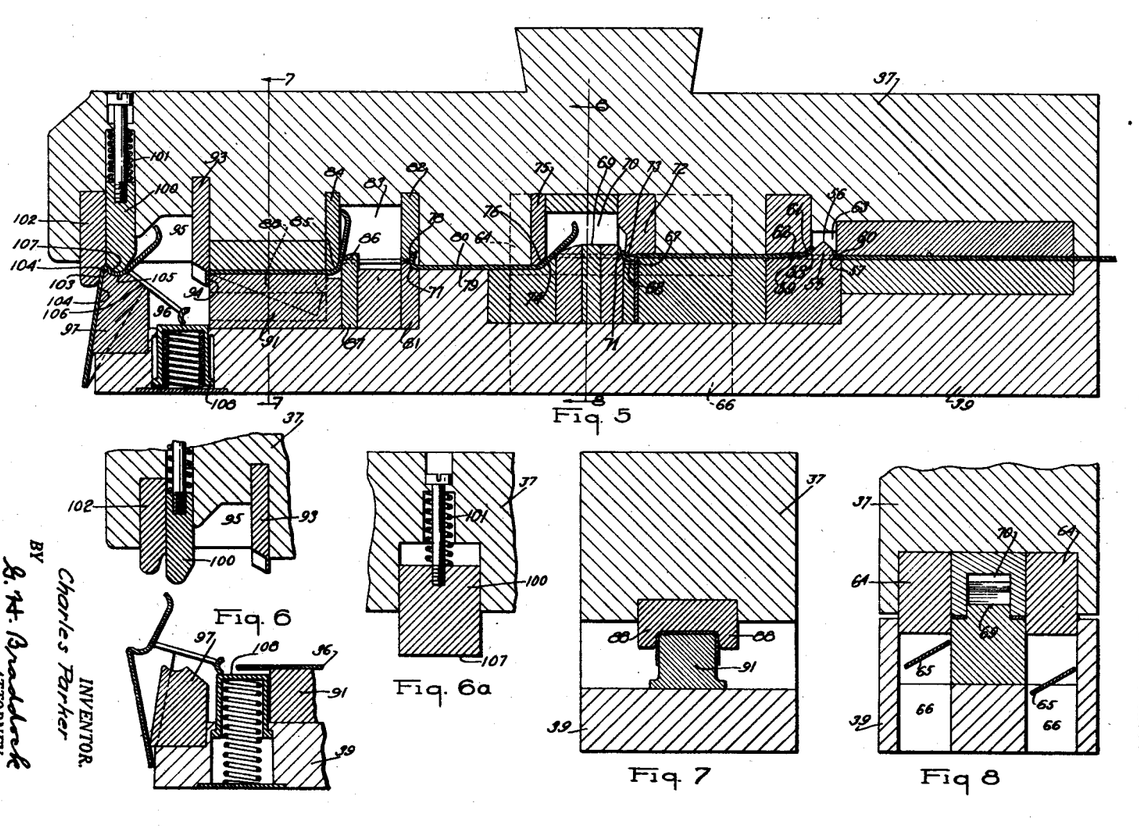
Figure 9:
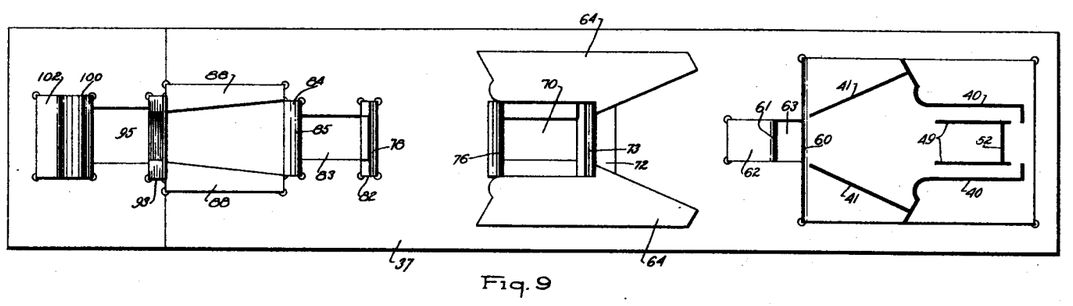
Fig. 9 is a bottom plan view of the upper or movable die on the machine.

Of the apparatus for carrying out the steps of the method, 37 represents as an entirety the movable die, it being suitably connected to the slide 5. 38 represents a bolster or die bed for the stationary die, detachably secured to the bed 4 in any suitable manner. 39 represents as an entirety a stationary die suitably secured in the die bed 38. The dies 37 and 39, which cooperate with each other to form and assemble the links, are arranged in longitudinal alignment with the line of feed of the strip 36 and are properly centered relatively to the said line of feed.

Figures 11, 12, 13, 14, 15, 16:
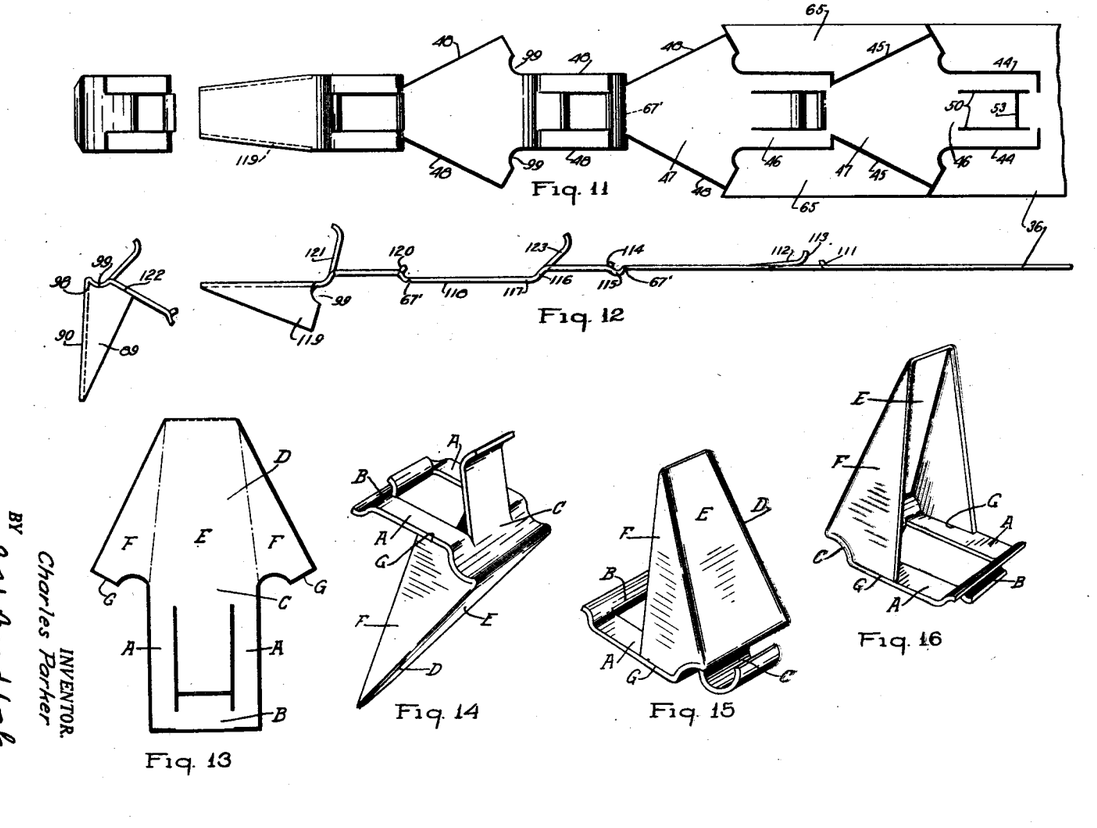
Fig. 11 is a plan view of a strip of metal in process of formation into links, a completed link being shown.
Fig. 12 is an edge view of the metal strip and link of Fig. 11.
Fig. 13 is a plan view of a detached blank of shape to provide the improved link, including score lines marking the inner edges of the link side bars, and dotted lines marking the joining edges between the extension and braces of the working attachment of the link.
Fig. 14 is a perspective view of the link as it leaves the machine.
Figs. 15 and 16 are perspective views of the link with the long, narrow lip of the sprocket bar rolled to final or assembling position.

40, 41, represents scoring knives or chisels arranged at the right hand end of the movable die 37, and 42, 43, represent corresponding scoring knives or chisels carried upon the stationary die 39, said scoring knives or chisels being adapted to impart the areas of score 44, 45 to the upper and lower surfaces of the strip 36 to define the outlines of a link blank including a link body 46 and a working attachment or wing 47, said knives being constructed to provide beveled edges 48, already mentioned.

49 are scoring knives or chisels arranged upon the movable die 37 and between the knives 40 adapted to impart lines of score 50 to the upper surface of the strip of metal, which lines are approximately parallel in the direction of the feed of said strip.

51 are corresponding scoring knives or chisels carried upon the stationary die 39 and arranged to impart lines of score to the under surface of the strip of metal, each of which lines is directly beneath a line of score imparted by one of the upper scoring knives 49.

52 is a scoring knife or chisel arranged upon the upper die 37 and at right-angles to the knives 49, between said knives, and adapted to impart a line of score 53 to the upper surface of the strip of metal, and 54 is a corresponding scoring knife or chisel of the stationary die 39 and arranged to impart a line of score to the under surface of the strip of metal directly beneath the line of score imparted by the knife 52.

55 is a severing and crimping element of the lower die having a transverse cutting edge 56, a rearward concave crimping surface 57, and a forward concave crimping surface 58 which merges in a forwardly disposed inclined surface 59. The upper die has a convex crimping surface 60 complemental to the surface 57, and a convex crimping surface 61 complemental to the surface 58, in front of which is an inclined surface 62, complemental to the surface 59. The severing and crimping element 55 is adapted to enter a recess 63 of the upper or movable die between the convex crimping surfaces 60 and 61 thereof. The element 55 is for the purpose of severing the metal of the strip along the lines of score made by the scoring knives 49, 51, and 52, 54, and cooperates with the complemental elements of the movable die 37 to crimp the end portions of the severed metal and to displace said severed metal slightly away from the plane of the strip of metal. The longer severed central portion of the link body is to provide the long, narrow lip of the sprocket or large end bar of the link, and the shorter severed central portion of said body is to provide the short, narrow lip of the small end bar of said link. The surfaces 57 and 60 cooperate to give said short, narrow lip a part circle crimp, usually less than a quarter circle, and the surfaces 58 and 61 cooperate to impart a quarter circle crimp to the free end portion of said long, narrow lip. The inclined surfaces 59 and 62 cooperate to raise the metal of said long, narrow lip above the plane of the strip of metal.

64, 64, are punch elements upon the movable die adapted to remove portions 65, 65, defined by the areas of score 44, 45, from the strip of metal, and 66, 66, are recesses in the stationary die cooperating with the punch elements 64, 64.

67 is a transverse scoring knife or chisel adapted to produce upon the lower surface of the metal a score defining an end of a link blank; that is to say, the knife 67 scores the metal transversely for its full width at the locations defining adjacent ends of separate blanks which are to become links. It should here be remarked that at one end of a blank is the small end bar or pintle of a link and at the other end is the outer edge of the link extension of the working attachment or wing, so that the locations of lines of severance along the length of the strip metal to provide individual links are between the short, wide lip of the small end bar or pintle of one link and the working attachment or wing of a preceding link.

The stationary die is recessed at 68 in advance of the scoring knife or chisel 67, and in front of the recess is a forming and bending projection 69 adapted to enter a recess 70 in the movable die.

The rearward face of the projection 69 includes a concave crimping surface 71 adjacent the recess 68. 72 is a small end bar forming punch element of the movable die above the recess 68 adapted to cooperate with the surface 71 and recess 68 to further shape the small end bar or pintle. The convex surface 73 of the element 72 and the concave surface 71 of the projection 69 together further crimp the short, narrow lip of the small end bar or pintle, and the element 72 and the scoring knife or chisel 67 together grasp the sheet metal strip or stock at the rearward end of the small end bar or pintle being shaped, while a portion of said convex surface 73 forces the metal of the short, wide lip of the small end bar or pintle into the recess 68 and gives to said short, wide lip the curvilinear shape of said surface 73.

The forming and bending projection 69 is adapted to throw the long, narrow lip of the sprocket or large end bar of the link further upwardly into the recess 70. The forward part of this projection includes an inclined, smoothly curved shaping surface 74 extending the full width of the link blank body and terminating at a location slightly below the horizontal plane of the strip of metal as it advances through the dies and to the location of the forming and bending projection.

75 is a forming and bending element of the movable die having a convex shaping surface 76 complemental to the surface 74. The combined action of the surfaces 74, 76 is to throw the short, wide lip of the sprocket bar downwardly and the long, narrow lip thereof further upwardly, to crimp or preliminarily form said short, wide lip, and to displace the rearward or inner end of the working attachment or wing downwardly below the line of feed of the strip of metal.

77 is a concave shaping surface of the stationary die adapted to cooperate with a recessed section 78 of the movable die to complete the rounding and formation of the small end bar of the link and to position said small end bar at desired angle with respect to the link side bars. The shaping surface 77 slants upwardly from a flat surface 79 of the stationary die which aligns with the lowermost point of the shaping surface 74, and the recessed section 78 is slightly above a flat surface 80 of the movable die which aligns with the lowermost point of the surface 76. The surfaces 79 and 80 cause the full length of the working attachment or wing to lie in the plane of the rearward or inner end thereof.

81 is an element of the stationary die having the shaping surface 77, and 82 is an element of the movable die having the recessed section 78. In advance of the element 82 the movable die is recessed as at 83 to clear the long, narrow lip of the sprocket or large end bar. 84 is a forming element of the movable die in front of the recess 83 and having a shaping surface 85 adapted to engage the partially shaped short, wide lip of the sprocket bar, to give said lip, in cooperation with a forming surface 86 upon an element 87 of the stationary die, its final shape.

The elements 81 and 87 of the stationary die terminate at their upper ends in the plane of the feed of the strip of metal (slightly above the plane to which the working attachment or wing is depressed) and maintain the side bars of the link blank at their desired elevation while the small end bar of the link is being finally formed and positioned and the sprocket bar is being formed and positioned for its rolling operation—an operation (not disclosed in the present machine) which assembles the link with the small end bar of a similar or dissimilar link.

The action of the elements 81 and 82 is to locate the end portions of the side bars adjacent the small end bar in the line of feed of the strip of metal, while the surface 77 and recessed section 78 curl the small end bar to its final form (upwardly from the preceding working attachment) and position said small end bar at desired angle with respect to said side bars. The combined action of the forming element 84 and the forming surface 86 is to throw the long, narrow lip of the sprocket or large end bar still further upwardly in the recess 83 and the short, wide lip thereof further downwardly, to give the sprocket bar almost vertical position, the element 87 having said surface 86 maintaining the forward ends of the side bars at the elevation of their rearward ends.

88 are bending elements upon the movable die 37 to shape or bend the braces 89 of the working attachment or wing of a link with respect to the link extension 90 thereof. The stationary die includes a former 91 adapted to be received by said bending elements. The base 92 of the former has approximately the area and shape of the link extension 90, which tapers, as disclosed, and the bending elements 88 are spaced apart a distance to bend the braces 89 of the working attachment or wing about the taper edges of the base of the former to cause said braces to preferably be at right-angles to the link extension. See Fig. 7.

93 is a cutting or severing knife upon the movable die to cooperate with the forward edge 94 of the former to sever the link blank from the strip of metal along the line of score 67' made by the knife 67. In advance of the severing knife 93 the movable die is recessed as at 95 to clear the long, narrow lip of the sprocket bar, and the stationary die has a recess 96 opposite the recess 95 to receive the side bars and small end bar or pintle of the severed link.

97 is a tool of the stationary die in advance of the recess 96 adapted to cooperate with a tool of the movable die in advance of the recess 95 to bend the metal of the strip or stock along a transverse line 98 between the inner end of the working attachment or wing and the outer end of the short, wide lip of the sprocket or large end bar of the link, to place said working attachment or wing at desired angle to the side bars of the link so that the inner ends of the braces of said working attachment or wing engage the sprocket bar and the portions of the side bars adjacent said sprocket bar. As disclosed, the working attachment or wing is at an approximate right-angle to the link body. The inner ends of the braces are cut away as at 99 to fit the curved, short, wide lip of the sprocket bar.

Of the tool of the movable die in advance of the recess 95, 100 is a presser foot urged downwardly by a coil spring 101, and 102 is a bending element adjacent the presser foot and including a transverse bending face 103 adapted to cooperate with the forward, almost vertical face 104 of the tool 97. The upper surface of said tool 97 is of shape to nicely fit the link body; that is to say, said upper face includes a transverse curvilinear depression 105 to receive the outer face of the short, wide lip of the sprocket bar of the link, and an oblique surface 106 extending downwardly from said curvilinear depression adapted to be engaged by the side bars of the link when severed from the strip of metal by the severing knife 93. The tool 97 is of width to enter between the braces 89 during the bending operation. The presser foot has a convex outer end 107 adapted to hold said short, wide lip of the sprocket bar in the depression 105 while the bending element 102 is functioning to bend the working attachment or wing about the edge 104' of the tool 97, between the face 104 and depression 105. 108 is a spring pressed knock-out in the stationary die at the base of the recess 96.

Figure 10:
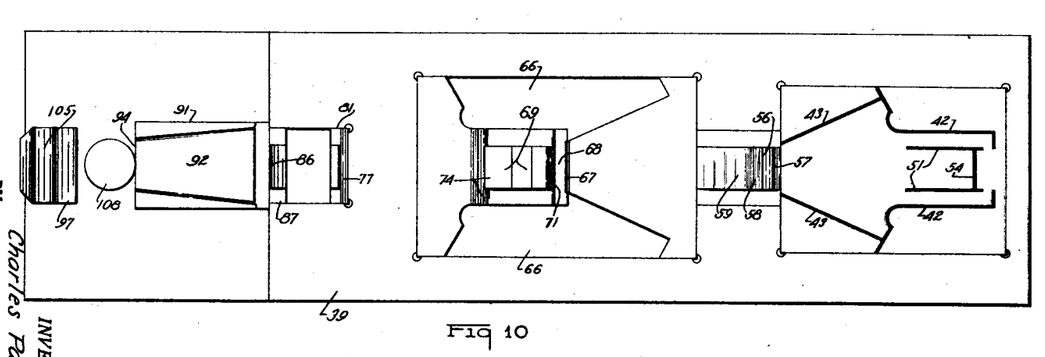
Fig. 10 is a top plan view of the lower or stationary die on the machine;

As will be most clear from Figs. 5 and 10, the upper face of the stationary die 39 is constructed to properly support the full width of the flat sheet metal strip 36, in order that the scoring 44, 45, can be properly accomplished, it being noted that two of these areas of score, the areas 44 as disclosed, extend to the side edges of the strip of metal in order that areas 44 of a link blank and areas 45 of an adjacent link blank can be simultaneously severed; that is to say, in order that areas of score 44 of a link blank can be severed independently of areas of score 45 thereof, and vice versa.

109 is a strip gage for centering the metal strip relatively to the forming dies as it is fed forwardly, step by step. It preferably consists of a bar of metal 109' arranged transversely on the stationary die bed 38 and suitably secured in position a little distance from the scoring knives or chisels at the right hand end of the machine. In the top of this piece of metal is cut a V-shaped groove 110 with the axis of the V in the vertical central longitudinal plane of the dies. The walls of this V-shaped groove are preferably elevated somewhat above the horizontal plane of the stationary die and the width of the groove at its middle vertically is preferably of the width of the standard size strip to be used with the set of dies to which the gage is attached. The taper of the gage allows for variations in width of the strip of metal 36, so as to insure the proper centering of the strip despite its variation in width.

The operation of the machine will be readily understood. A strip of metal 36 is directed through the feed mechanism until the gripping jaws 26', 27', of said feed mechanism can engage with it. Power is then applied through the counter shaft 9 to actuate the feed mechanism and slide 5. The strip 36 is guided and centered by the gage 109, so as to lie properly between the dies 37 and 39. The slide 5 descends and a section of metal which is to form a link blank is first acted upon by the scoring knives or chisels 40, 41, 42, 43, 49, 51, 52, 54, to make the areas of score 44, 45, and the lines of score 50, 53, as shown in Fig. 11. The upper die is then elevated and the feed mechanism operates to feed the stock forward one step. This brings the scored sections 45 in position to be operated upon by the punch elements 64, and the scored lines 50, 53 in position to be operated upon by the severing and crimping element 55 of the stationary die cooperating with complemental elements of the movable die. The slide descends and the portions of metal defined by the score areas 45 (the rearward parts of 65) are removed from the strip. Also, the cutting edge 56 of the severing and crimping element 55 severs the metal along the line of score 53, the side edges of said severing and crimping element sever the metal along the lines of score 50, the surfaces 57 and 60 cooperate to give the short, narrow lip of the small end bar or pintle a part circle crimp, as indicated at 111, displacing said short lip upwardly beyond the plane of the strip of metal, the inclined surfaces 59 and 62 cooperate to raise the metal of the long, narrow lip of the sprocket or large end bar slightly above the plane of the strip of metal, as indicated at 112, and the surfaces 58 and 61 cooperate to impart a quarter circle crimp to the free end portion of said long, narrow lip, as indicated at 113. When the slide is next elevated, the feed mechanism advances the stock another step. The slide descends and the punch elements 64 remove the portions of metal defined by the areas of score 44 (the forward parts of 65) from the strip. In practice, the punch elements 64 simultaneously remove from the strip whole portions 65 defined by the areas of score 44 of one link blank and the areas of score 45 of the next preceding link blank, as will be understood Also, upon this descent of the slide, the score knife 67 operates to produce the score 67' defining the rearward end of a link blank, and the forming and bending projection 69 cooperates with complemental elements of the movable die to further shape the end bars of the link blank body. The convex surface 73 and the concave surface 71 cooperate to additionally crimp the short, narrow lip of the small end bar or pintle, as indicated at 114, the surface 73 forces the metal of the short, wide lip of the small end bar or pintle to take the part circle shape of said surface 73, as indicated at 115, and the curved surface 74 of the projection 69 cooperates with the convex crimping surface 76 of the forming and bending element 75 to throw the long, narrow lip of the sprocket bar further upwardly, as indicated at 123, and the short, wide lip thereof downwardly and to crimp or form said short, wide lip, as indicated at 116, and to displace the rearward or inner end of the working attachment or wing downwardly below the line of feed of the strip of metal, as indicated at 117. The flat surfaces 79 and 80 cooperate to place the full length of the working attachment or wing in the plane of the rearward or inner end thereof, as indicated at 118. The slide is again elevated to bring the link blank to position where the brace bending tools operate, and the small end bar and sprocket bar finishing elements also operate. The bending elements 88 cooperate with the former 91 to bend the braces 89 so that they are approximately at right-angles to the link extension 90 of the link, as indicated at 119. The elements 81 and 82 locate the end portions of the link blank side bars adjacent the small end bar in the line of horizontal feed of the strip of metal as it approaches and reaches the forming and bending projection 69. The surface 77 and recessed section 78 cooperate to curl the short, narrow lip and the short, wide lip of the small end bar or pintle to final curvilinear shape and to displace said small end bar or pintle upwardly with respect to the working attachment or wing of the link blank preceding and locate said small end bar or pintle at desired angle with respect to the link side bars, as indicated at 120. The forming element 84 and the forming surface 86 cooperate to throw the long, narrow lip of the sprocket or large end bar further upwardly in the recess 83 and the short, wide lip of said large end bar further downwardly, to put said sprocket or large end bar in condition for a final rolling operation, as indicated at 121, an operation (not disclosed in the present machine) adapted to assemble the link with the small end bar of a similar or dissimilar link. The slide is again elevated and the strip is fed forward another step, bringing the link blank into its final forming position. The slide descends and the knife 93 cooperates with the forward edge 94 of the former 91 to sever the link blank from the strip of metal along the line of score 67', carrying the side bars and small end bar or pintle into the recess 96 against the action of the spring-pressed knock-out 108. In advance of the cutting off of the link blank, the presser foot 100 engages the inner or upper face of the short, wide lip of the sprocket or large end bar and holds the outer or lower face thereof in the depression 105. As the slide further descends, the faces 103 and 104 cooperate to bend the metal of the blank along the line 98 of joining of the link body to the link extension, about the edge 104' of the tool 97, the link blank body now being securely held by the presser foot to the tool 97. The tool 97 is of width to nicely enter the cavity of the link between the braces 89, and the face 104 is at proper angle to the depression 105 so that when the bend at 98 is completed, the inner edges of the braces 89 are in engagement with the curved short, wide lip of the sprocket or large end bar and with portions of the link side bars adjacent said short, wide lip, as indicated at 122. Upon the next elevation of the slide, the spring pressed knock-out removes the finished link from the machine. See Fig. 6.

The corn binder link as constructed upon the machine is ready to be assembled with the small end bar or pintle of another link. This can be done by hand, or the link can be fed to a different machine to be interspersed in a strand of chain. Or a number of the corn binder links can be connected together to form a chain. It will be seen that the dies of the present machine operate simultaneously to perform progressive steps in the formation from a relatively wide, flat strip of metal of so-called corn binder links ready for assembly in a chain.

The dies 37 and 39 are shown as being made up of a number of pieces or sections of metal. Such construction permits the relative adjustment of the various forming elements of each die, should one of them wear more than others, or the proper relationship of the forming elements be, for any reason, disarranged. It will be understood, however, that each of these dies or die blocks, in normal operation, consists of a plurality of relatively immovable link forming, shaping and connecting elements, with the exception of the die having presser foot, and each as an entirety may be formed from a single piece of metal, if desired, so that the die will be solid throughout.

Fig. 13 discloses in plan a detached blank to provide the link of the invention, Fig. 14 discloses in perspective a link as it comes from the machine, with sprocket or large end bar ready for its rolling operation, and Figs. 15 and 16 are perspective views of the improved sheet metal link with sprocket or large end bar rolled to final circular form. In said Figs. 13 to 16, A denotes the side bars of the link body, B the small end bar, C the large end bar, and D represents the working attachment or wing consisting of the link extension E approximately at right-angles to the link body and connected to the outer end of the short, wide lip of the sprocket or large end bar, and the braces F at right-angles to the link extension and having their inner ends G engaging the short, wide lip of the sprocket bar and adjacent portions of the side bars A. The link is composed of but a single piece of sheet metal.

It will be evident that the process and apparatus utilized by me in making my novel corn binder link, as hereinbefore fully set forth, greatly facilitate the manufacture of this special type of link and are designed to produce an improved link superior in quality to any of the same kind heretofore made, principally for the reasons that the process can be practiced upon a single machine, that the apparatus affords simple means for systematically carrying out the steps of the process, and that a corn binder link composed of a single piece or length of strip metal is necessarily stronger and more satisfactory than a cast link or a built-up link.

It will also be evident that the elements for providing the working attachment or wing of the novel link can be of any suitable construction to produce a corn binder link, or other type C link, with attachment or wing set at any preferred angle to the link body. The braces 89 could be omitted entirely, or a brace upon the free end of the attachment or wing and engaging the link body could be substituted for said braces 89. Where side braces are not utilized, the width of the strip metal would be the same as the width of the finished link, and there would be no necessity for removing portions of metal from the strip. Clearly, the working attachment or wing could be provided with a hole or holes for various well known purposes.

To those skilled in the art of manufacturing chain links of the character illustrated and described, many alterations in construction and widely differing embodiments and applications of the invention will suggest themselves without departing from the spirit and scope of the claims. The disclosure and description herein, as they relate to the process, apparatus, and link itself, are purely illustrative and are not intended to be in any sense limiting.

What I claim is:

1. The process of making a chain link from a blank of sheet metal, said link having side bars and end bars, and a special attachment or wing upon one of said end bars, which consists in operating upon the blank to define said side and end bars and said attachment or wing, in bending, forming, and shaping said blank to produce said link and attachment or wing, in performing certain of the bending, forming, and shaping operations upon the link portion of said blank simultaneously with the performance of operations upon the attachment or wing portion thereof, and in finally bending said attachment or wing to desired angle with respect to said link.

2. The process of making a chain link from a strip of sheet metal, said link having side bars and end bars, and a special attachment or wing upon one of said end bars, which consists in producing upon a blank of said strip areas of score outlining a link body and a link attachment or wing and lines of score defining side bars and end bars of said link body; in severing the metal along said lines of score and preliminarily shaping said end bars; in severing the metal along said areas of score thus defining said link body and attachment or wing; in further shaping and forming the end bars of said link body; in bending portions of said special attachment or wing relatively to other portions thereof; and in severing the link blank from the strip of metal and bending the link body and the special attachment or wing as a whole relatively to each other to complete the link.

3. The process of making a chain link from a strip of sheet metal, said link having side bars and end bars, and a special attachment or wing upon one of said end bars, which consists in producing upon a blank of said strip areas of score outlining a link body and a link attachment or wing and lines of score defining side bars and end bars of said link body; in severing the metal along said lines of score and preliminarily shaping said end bars; in severing the metal along said areas of score thus defining said link body and attachment or wing; in further shaping and forming the end bars of said link body; in bending portions of said special attachment or wing relatively to other portions thereof and finally shaping said end bars; and in severing the link blank from the strip of metal and bending the link body and the special attachment or wing as a whole relatively to each other to complete the link.

4. The process of making a chain link from a strip of sheet metal, said link having side bars and end bars, and a special attachment or wing upon one of said end bars, which consists in producing upon a blank of said strip areas of score outlining a link body and a link attachment or wing and lines of score defining side bars and end bars of said link body; in severing the metal along said lines of score and preliminarily shaping said end bars; in severing the metal along said areas of score thus defining said link body and attachment or wing; in further shaping and forming the end bars of said link body; in bending portions of said special attachment or wing relatively to other portions thereof and finally shaping one of said end bars to part circle shape and the other end bar to general curved conformation adapting it to be later rolled to part circle shape about an adjacent end bar of a different link; and in severing the link blank from the strip of metal and bending the link body and special attachment or wing as a whole relatively to each other to complete the link.

5. The process of making a chain link from a strip of sheet metal, said link having side bars and end bars, and a special attachment or wing upon one of said end bars, said attachment or wing consisting of an extension of said one end bar at an angle to said link and braces upon said extension and engaging said link, which consists in producing upon a blank of said strip areas of score outlining a link body and an attachment or wing and lines of score defining said side bars and end bars; in severing the metal along said areas of score thus defining said link body and attachment or wing; in severing the metal along said lines of score; in shaping and forming said end bars; in bending the braces of said attachment or wing relatively to the link extension thereof; and in severing the link blank from the strip of metal and bending the link body and the special attachment or wing as a whole relatively to each other to complete the link.

6. The process of making a chain link from a strip of sheet metal, said link having side bars and end bars and a special attachment or wing upon one of said end bars, said attachment or wing consisting of an extension of said one end bar at an angle to said link and braces upon said extension, which consists in producing upon a blank of said strip areas of score outlining a link body and an attachment or wing and lines of score defining said side bars and end bars; in severing the metal along said areas of score thus defining said link body and attachment or wing; in severing the metal along said lines of score and simultaneously crimping the center portion of the link body thus preliminarily shaping said end bars; in further shaping and forming said end bars; in bending the braces of said attachment or wing relatively to the link extension thereof and finally shaping said end bars; and in severing the link blank from the strip of metal and bending the link body and the special attachment or wing as a whole relatively to each other to complete the link.

7. The process of making a chain link from a strip of sheet metal, said link having side bars and end bars, and an attachment or wing upon one of said end bars, said attachment or wing consisting of an extension of said one end bar at an angle to said link and braces upon said extension at an angle thereto, which consists in defining upon a blank of said strip a link body and a link attachment integral with said body; in bending, forming, and shaping said link body to provide said side bars and end bars of the link; in bending the braces of said attachment or wing relatively to the link extension thereof; and in severing the link blank from the strip of metal and bending the link body and attachment or wing relatively to each other to complete the link.

8. The process of making a chain link from a strip of sheet metal, said link having side bars and end bars, and a special attachment or wing consisting of an extension of one of said end bars at an angle to said link and braces upon said extension and engaging said link, which consists in producing upon a blank of said strip areas of score outlining a link body and an attachment or wing and lines of score defining said side bars and end bars; in severing the metal along said areas of score and simultaneously crimping the center portion of the link blank thus preliminarily shaping said end bars; in further rounding and shaping said end bars and transversely scoring the metal to define the rear end of said link blank; in bending the braces of said attachment or wing relatively to the link extension thereof; in finally shaping said end bars; in removing the blank from the strip; and in bending said link and attachment or wing relatively to each other so that the inner ends of said braces engage said link.

9. In a machine for making a chain link from a blank of sheet metal, said link having a working attachment or wing thereon, the combination of forming dies for producing said link, a bending element for producing said working attachment or wing, and a bending element for positioning said link and working attachment or wing at an angle with respect to each other.

10. In a machine for making a chain link from a blank of sheet metal, said link having a working attachment or wing at one end of the link, the combination of forming and shaping dies for producing said link, with a bending die for producing said working attachment or wing, and a bending die for fixing said link and attachment or wing at desired angle with respect to each other.

11. In a machine for making a chain link from a blank of sheet metal, said link having a working attachment or wing upon one end of the link, the combination of forming dies for producing said link, with bending elements for producing said working attachment or wing and for bending said link and working attachment or wing relatively to each other.

12. In a machine for making a chain link from a blank of sheet metal, said link having a working attachment or wing at one end of the link, the combination of forming dies for producing said link, with a shaping element for producing said attachment or wing, and a bending and forming element for setting said link and attachment or wing relatively to each other.

13. In a machine for making a chain link from a blank of sheet metal, said link having a working attachment or wing at one end of the link, the combination of forming and shaping dies for producing said link, with a forming element for shaping said attachment or wing, and a bending and forming element for positioning said link and attachment or wing at an angle with respect to each other.

14. In a machine for making a chain link from a blank of sheet metal, said link having side bars and end bars, and a special attachment or wing thereon, the combination of forming dies for producing the side and end bars of said link, a bending element for producing said attachment or wing, and a bending element for positioning said link and attachment or wing at an angle with respect to each other.

15. In a machine for making a chain link from a blank of sheet metal, said link having side bars and end bars, and a special attachment or wing upon one of said end bars, the combination of forming and shaping dies for producing the side and end bars of said link, with a forming element for bending a portion of said attachment or wing relatively to a different portion thereof, and a bending and forming element for setting said attachment or wing and said link at an angle with respect to each other.

16. In a machine for making a chain link from a blank of sheet metal, said link having side and end bars and a special attachment or wing, and said attachment or wing consisting of an extension of one of said end bars, the combination of forming, bending, and shaping dies for producing said side and end bars, with a bending element for producing said attachment or wing.

17. In a machine for making a chain link from a blank of sheet metal, said link having side and end bars and a special attachment or wing, and said attachment or wing consisting of an extension of one of said end bars and braces upon said extension, the combination of forming, bending, and shaping dies for producing said side and end bars, with bending and forming elements for producing said attachment or wing and for setting said link and attachment or wing at an angle to each other.

18. In a machine for making a chain link from a blank of sheet metal, said link having side and end bars and a special attachment or wing, and said attachment or wing consisting of an extension of one of said end bars and braces upon said extension, the combination of forming, bending, and shaping dies for producing said side and end bars, with a bending and forming element for producing said attachment or wing, and a bending and forming element for positioning said link and attachment or wing relatively to each other.

19. In a machine for making a chain link from a blank of sheet metal, said link having side bars, end bars, and an attachment or wing which includes an extension of said link at an angle thereto and braces upon said extension and engaging said link, the combination of means for producing the side and end bars of said link, with means for bending said braces relatively to said extension to produce said attachment or wing, and means for bending said attachment or wing as a whole relatively to said link.

20. In a machine for making a chain link from a strip of sheet metal, said link having side bars, end bars, and an attachment or wing which includes an extension of said link at an angle thereto and braces upon said extension and between the extension and link, the combination of means for providing a blank including a link portion and an attachment or wing portion, and means for producing the side and end bars of said link, with means for bending said braces relatively to said extension of said attachment or wing portion to produce said attachment or wing.

21. The combination as specified in claim 20, and means for bending said attachment or wing relatively to said link portion to complete the link.

22. In a machine for making a chain link from a strip of flat sheet metal, said link having side and end bars and a special attachment or wing at one end of the link, the combination of means for producing a blank from said strip including a flat link body portion and a flat attachment or wing, link forming and shaping elements, a bending element for forming said flat attachment or wing into a special attachment or wing, and a bending element for positioning said special attachment or wing at an angle to said link body.

23. In a machine for making a chain link from a blank of sheet metal, said link having an attachment or wing, the combination of means for progressively operating upon the blank to produce a link having side and end bars, with means for progressively operating upon the blank to produce said attachment or wing, certain of said means for producing said link acting simultaneously with means for producing said attachment or wing.

24. The combination as specified in claim 23, and means for positioning said attachment or wing at an angle to said link.

25. In a machine for making a chain link from a strip of sheet metal, said link having side bars and end bars, and a special attachment or wing upon one of said end bars, means for removing portions from the strip to define a blank comprising a link body portion and a link attachment or wing portion, and means for operating upon the blank to provide a link and a special attachment or wing.

26. In a machine for making a chain link from a strip of sheet metal, said link having side bars and end bars, and a special attachment or wing upon one of said end bars, means for removing portions from the strip to define a blank comprising a link body portion and a link attachment or wing portion, means for operating upon the blank to provide a link and a special attachment or wing, and means for positioning said attachment or wing at desired angle to said link body.

27. In a machine for making a chain link from a blank of sheet metal, said link having side bars and end bars, and a special attachment or wing upon one of said end bars, the combination with means for operating upon the blank to define the outlines of said side and end bars and of said attachment or wing, of bending, forming, and shaping elements to produce said link and said attachment or wing, and a link finishing element adapted to finally bend said attachment or wing to desired angle with respect to said link.

28. In a machine for making a chain link from a strip of sheet metal, said link having side bars and end bars, and an attachment or wing upon one of said end bars, said attachment or wing consisting of an extension of said one end bar at an angle to said link and braces upon said extension at an angle thereto, the combination of means for defining a blank including a link body and a link attachment integral with said body, with bending, forming, and shaping elements for providing side and end bars of said link, forming and shaping elements for bending the braces of said attachment or wing relatively to the link extension thereof, means for severing the link blank from the strip of metal, and finishing elements for bending the link body and attachment or wing relatively to each other to complete the link.

29. In a machine for making a chain link from a strip of sheet metal, said link having side bars and end bars, and a special attachment or wing upon one of said end bars, the combination with means for producing upon a blank of said strip areas of score outlining a link body and a link attachment or wing and lines of score defining side bars and end bars of said link body, of means for severing the metal along said lines of score and for preliminarily shaping said end bars, means for severing the metal along said areas of score to define said link body and attachment or wing, means for further shaping and forming the end bars of said link body, means for bending portions of said special attachment or wing relatively to other portions thereof to produce said attachment or wing, means for severing the link blank from said strip, and means for bending the link body and special attachment or wing relatively to each other to complete the link.

30. In a machine for making a chain link from a strip of sheet metal, said link having side bars and end bars, and a special attachment or wing consisting of an extension of one of said end bars at an angle to said like and braces upon said extension and engaging said link, the combination with means for producing upon said strip areas of score outlining a blank comprising a link body and an attachment or wing and lines of score defining said side bars and end bars, of means for severing the metal along said areas of score, means for severing the metal along said lines of score and for crimping the center portion of the link body to preliminarily shape said end bars, means for further rounding and shaping said end bars, means for bending the braces of said attachment or wing relatively to the link extension thereof, means for giving said end bars final shape, means for removing the link blank from the strip of metal, and means for bending the attachment or wing relatively to the link body so that the braces engage said link body.

31. In a machine for making a chain link from a strip of sheet metal, said link including a special attachment or wing, the combination of means for producing the link and the attachment or wing from a blank while part of the strip, with means for severing said blank from the strip, and means for bending the link and the attachment or wing relatively to each other to complete the chain link.

32. In a machine for making a chain link from a strip of sheet metal, said link including a special attachment or wing, the combination of means for producing the link and the attachment or wing from a blank while part of the strip, with means for severing said blank from the strip, means for bending the link and the attachment or wing relatively to each other to complete the chain link, and means for removing the finished link from the machine.

33. In a machine for making a chain link from a strip of sheet metal, said link having a special attachment or wing including an extension of the link at an angle thereto and braces upon and at an angle to said extension, the combination of means acting upon a blank while part of the strip for producing the link and for bending said braces relatively to said extension to produce said special attachment or wing, with means for severing said partially completed blank from the strip, and means for bending the link and attachment or wing relatively to each other to complete the chain link.

34. The combination as specified in claim 33, and means for removing the finished link from the machine.

35. In a machine for making a chain link from a strip of sheet metal, said link having a special attachment or wing, the combination of means for producing the link and the attachment or wing, and means for severing the produced link and attachment or wing from the strip, with means including a fixed tool and a tool with spring acting presser foot for bending said link and attachment or wing relatively to each other to complete the chain link, and a spring pressed knockout for removing the finished link from the machine.

36. In a machine for making a chain link from a strip of flat sheet metal, said link having side and end bars and a special attachment or wing, the combination of means for producing a blank from said strip including a flat link body portion and a flat attachment or wing, link forming and shaping elements, a bending element for forming said flat attachment or wing into a special attachment or wing, and a bending element for positioning said special attachment or wing at an angle to said link body.

37. In a machine for making a chain link from a strip of sheet metal, said link including a special attachment or wing, the combination of means for producing the link and the attachment or wing from a blank, with means for severing said blank from the strip, and means for bending the link and the attachment or wing relatively to each other to complete the chain link.

38. In a machine for making a chain link from a strip of sheet metal, said link including a special attachment or wing, the combination of means for producing the link and the attachment or wing from a blank, with means for severing said blank from the strip, means for bending the link and the attachment or wing relatively to each other to complete the chain link, and means for removing the finished link from the machine.

Signed at Bridgeport, in the county of Fairfield and State of Connecticut, this 31st day of March A. D., 1925.

CHARLES PARKER.